United States Patent
Arnquist et al.

(10) Patent No.: US 7,950,027 B2
(45) Date of Patent: May 24, 2011

(54) MUTABLE APPLICATION EXPERIENCE AND USER INTERFACE

(75) Inventors: Michael Arnquist, Woodinville, WA (US); Mark Young, Redmond, WA (US); Sam Clement, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1012 days.

(21) Appl. No.: 11/818,755

(22) Filed: Jun. 15, 2007

(65) Prior Publication Data

US 2008/0313650 A1    Dec. 18, 2008

(51) Int. Cl.
*G06F 13/00* (2006.01)

(52) U.S. Cl. ........ 719/331; 709/217; 709/218; 707/602; 715/201

(58) Field of Classification Search .................. 719/331; 709/217, 218; 707/602; 715/201
See application file for complete search history.

(56) References Cited

U.S. PATENT DOCUMENTS

| | | | |
|---|---|---|---|
| 5,555,365 A | 9/1996 | Selby et al. | |
| 5,768,510 A | 6/1998 | Gish | |
| 5,872,973 A | 2/1999 | Mitchell et al. | |
| 5,995,094 A | 11/1999 | Eggen et al. | |
| 6,269,473 B1 | 7/2001 | Freed et al. | |
| 6,820,135 B1 * | 11/2004 | Dingman et al. | 709/246 |
| 6,948,133 B2 | 9/2005 | Haley | |
| 7,000,219 B2 | 2/2006 | Barrett et al. | |
| 7,082,521 B1 | 7/2006 | Nanja | |
| 7,788,214 B2 * | 8/2010 | Fernandez et al. | 707/602 |
| 2004/0029575 A1 | 2/2004 | Mehta | |
| 2004/0250241 A1 | 12/2004 | O'Neil et al. | |
| 2005/0188350 A1 * | 8/2005 | Bent et al. | 717/106 |
| 2005/0229190 A1 | 10/2005 | Peters et al. | |

OTHER PUBLICATIONS

Amano, et al.,"An Approach for Constructing Dynamically Adaptable Component-based Software Systems using LEAD++".
Lumpe, Markus, "A n-Calculus Based Approach for Software Composition", Date: Jan. 21, 1999, pp. 1-200.
McKinley, et al., "A Taxonomy of Compositional Adaption", Date: Jul. 2004.

* cited by examiner

*Primary Examiner* — Andy Ho

(57) ABSTRACT

A dynamic and interchangeable set of application behaviors is implemented upon the same underlying software engine. Downloadable data provider behavior descriptors configure the UI generation application dynamically on demand to meet needs that are unknown at ship time, or otherwise cannot be predicted in advance—inputs, formats, contents, and the optimal user interface or experience, all change over time. A data provider supplies the data source locations, data feeds, poll/pull intervals on feeds, parameter definitions, data binding definitions, lists, groups, UI templates, data transformation logic, resources, and UI templates to plug into the base application engine, which transforms the supplied data to create a UI experience tailored to match the appropriate events and available data over time. The base application engine is agnostic to both the data provider and the input data received.

20 Claims, 8 Drawing Sheets

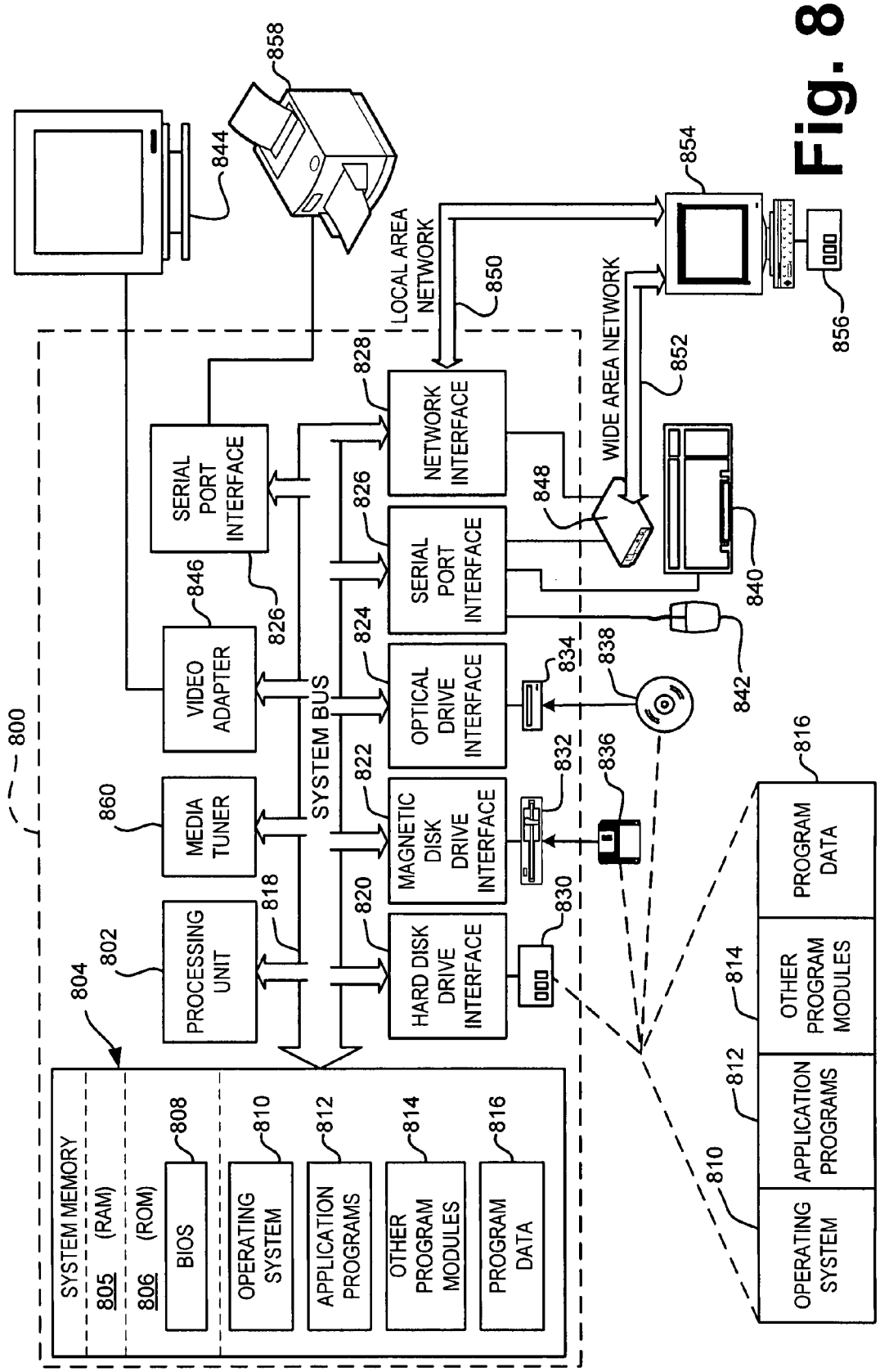

MUTABLE APPLICATION EXPERIENCE AND USER INTERFACE

BACKGROUND

Events and data for content and format are unable to be fully predicted in advance. Generally applications for processing data and the related user interfaces (UI) are developed as static engine code shipped with the product. Any changes to the application or UI must be made through the download and installation of updates to the static application code. In the case of applications for presenting information related to live events, for example, news events and sports, there is no ability to react to changing events and input data over time (e.g., in the sports metaphor, seasons, teams, leagues, players, scores, game events, etc.). There is further no ability to change the application to respond to changing external business conditions or rules (e.g., legal deals or prohibitions, etc.). Traditional patching mechanisms are infrequent, not dynamic enough, involve high overhead to develop the software update, and require procedures such as restarting the entire computer. A static, pre-constructed application thus offers users a sub-optimal experience or, in some cases, none at all.

SUMMARY

A dynamic and interchangeable set of application behaviors is implemented up on the same underlying software engine. Downloadable data provider behavior descriptors configure the UI generation application dynamically on demand to meet needs that are unknown at ship time, or otherwise cannot be predicted in advance. The list of inputs, their format and contents, and the optimal user interface or experience, all change over time. The data provider supplies the data source locations, data feeds, poll/pull intervals on feeds, parameter definitions, data binding definitions, lists, groups, data transformation logic, resources, and UI templates to plug into the base application engine, which transforms the supplied data to create a UI experience tailored to match the appropriate events and available data over time. The base application engine is agnostic to both the data provider and the input data received. The base application takes on an identity defined by the data provider, including appearance, functionality, and content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

FIG. 8 is a schematic diagram of a general purpose computing system that may be configured to provide the mutable application experience described herein.

DETAILED DESCRIPTION

Figure 1:
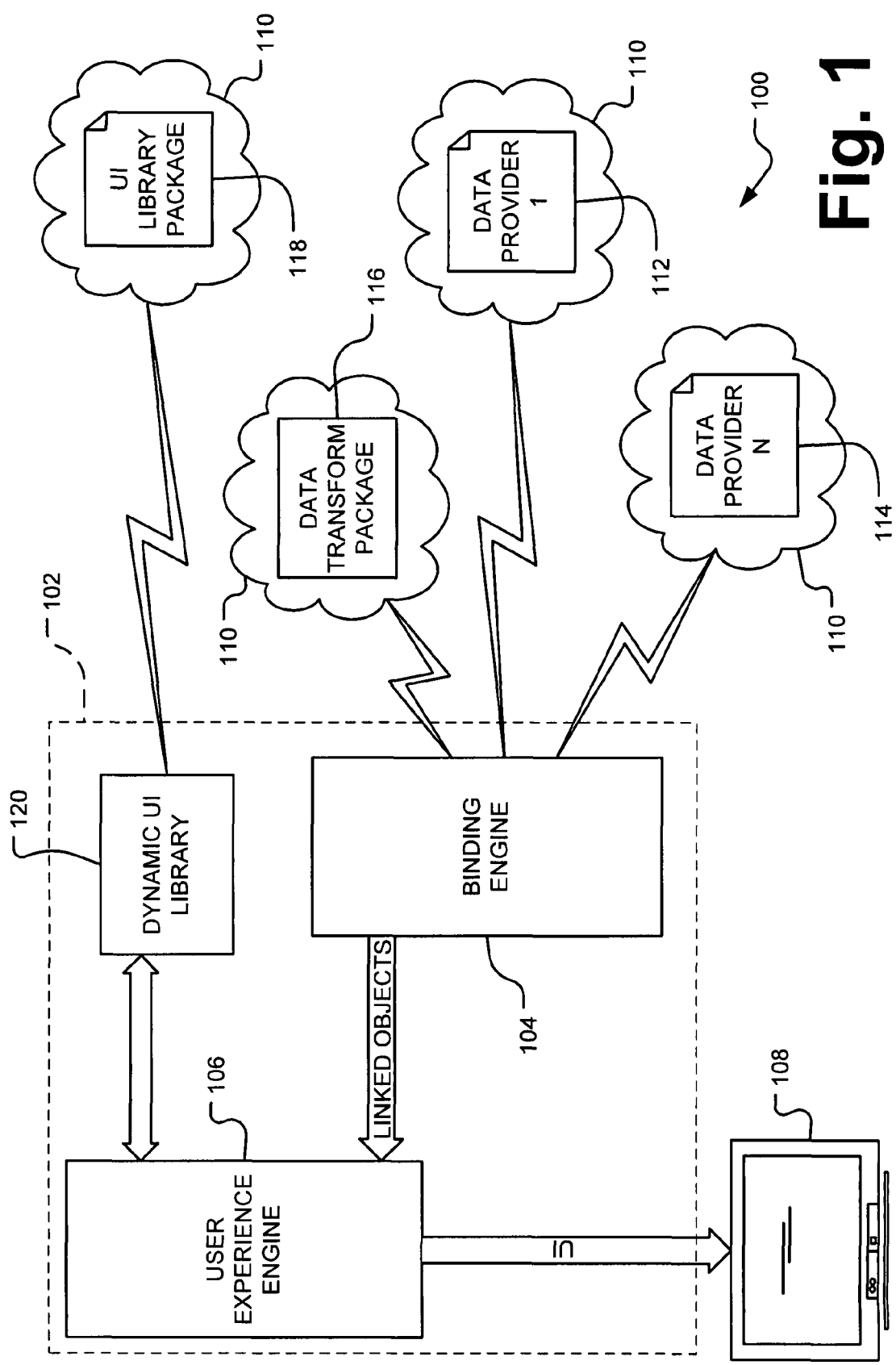
FIG. 1 is a schematic diagram of an exemplary system and network environment for providing a mutable application experience.

A dynamic application platform 100 for implementing an exemplary configuration of a mutable application experience is depicted in FIG. 1. The platform 100 is composed, in part, of a media processing device 102 in which several modules may operate to provide the mutable application experience. The media processing device 102 may be a personal computer configured to run a multi-media software package, for example, the Windows® XP Media Center Edition operating system (Microsoft Corporation, Redmond, Wash.). In such a configuration, the personal computer effectively operates to integrate full competing functionality within a complete home entertainment system.

The media processing device 102 may also include other components, for example: a personal video recorder (PVR) to capture live television show for future viewing or to record the future broadcast of a single program or series; a compact disc (CD) or digital video disc (DVD) drive for disc media playback; a media drive for integrated storage of and access to a users recorded content, e.g., television shows, music pictures, and home video; and an electronic program guide (EPG). Instead of a conventional personal computer, the media processing device 102 may be provided by an alternate hardware device capable of storing and distributing media content including, for example, a notebook or portable computer, a tablet computer, a workstation, a main frame computer, a server, an internet appliance, a handheld device, or combinations thereof. The media processing device 102 may also be a set-top box, primarily used for receiving and tuning cable or satellite television signals, but which may additionally be connected within a network to operate as a media processing device 102.

The media processing device 102 may include a binding engine module 104 and a user experience engine module 106. The binding engine module 104 may be considered the base or core application within the platform 100. The binding engine 104 is agnostic to any particular type of data or source of data that it processes. The purpose of the binding engine 104 is to collect data of various types and forms from one or more data providers and bind the data to management objects. The management objects may then be used by the user experience engine 106 to create a particular application experience for a user through a UI output to a presentation device 108. The presentation device 108 may be a television, a computer monitor, a display panel, or any other visual presentation device and may further include audio output devices such as speakers.

The data collected by the binding engine 104 may include any kind of data that may be formatted for presentation in a UI. For example, in one implementation the data may relate to live sporting events. The data received and processed by the binding engine 104 may be in the form of scores, game status, player statistics, team statistics, real-time player actions, audio clips, video clips, and any other data that may be formatted for presentation to a user. It should be apparent that the data received by and processed by the binding engine 104 need not be limited to sports data, but may comprise data related to any topic available for presentation, for example, data related to other live events, movies, and standard television shows.

The binding engine 104 may be connected to a network 110, for example, the Internet, through which it accesses receives the various types of data for processing. The data may be generated by one or more data providers 112, 114, that are similarly connected to the network 110. The data providers 112, 114 may be alternate sources of similar data, e.g., competing sports networks, or they might provide data relating to wholly different subject matters that may be alternately displayed in the mutable application experience. Continuing with the sports theme as an exemplary implementation, the first data provider 112 may be the ESPN network, which provides information about sporting events that it is contemporaneously monitoring. A second data provider 114 may be, for example, Fox Sports Net, which may provide alternate sports information related to the events in its broadcasting schedule.

Additionally, a data transform package 116 may be transmitted or accessed across the network 110 by the binding engine 104. The media processing device 102 may use the data transform package 116 to transform data received in various forms into a data that is manageable by the binding engine 104. For example, the data from a first data provider 112, e.g., ESPN, may be in a data format particularly developed by ESPN. The ESPN data may be formatted differently than similar data developed by a second data provider 114, e.g., Fox Sports Net. In this case, the data transform package 116 provides the necessary instructions and functions to transform both the information received from the first data provider 112 and the information in the different format provided by the second data provider 114 into a common data format understood by the binding engine 104.

For example, the information provided by the first data provider 112 may be coded in a first extensible mark-up language (XML) format while data from the second data provider 114 is provided in a second XML format. The data transform package 116 may contain an extensible style-sheet language transform (XSLT) to transform the data from its original format into a common format recognizable by the binding engine 104. XSLT is an XML-based language used for the transformation of XML documents, e.g., to convert data between different XML schemas. The original document is not changed; rather, a new document is created based on the content of an existing one.

In an alternate implementation, the data transformation may be provided by a service accessible over the network. The data transform service may reformat the data received from the data providers 112, 114 in a format that is readably usable and recognizable by the binding engine 104. This implementation may be less desirable as receipt of the transformed data from a network service may reduce the bandwidth of the network connection. Generally, the processing speed of the media processing device 102 and standard software platforms installed thereon are more than adequate to handle such XML transforms.

In addition to the content-related data received from the data providers 112, 114, the media processing device 102 may further receive a library package 118 of UI elements from an external source over the network 110. The UI elements may include UI templates, graphics, images, video clips, audio clips, and other resources for combination and presentation in the mutable UI. Many of the UI templates may incorporate the data as it is received and exposed in real time. The UI library package 118 may be developed by the data providers 112, 114 or by any other developer of UIs for the media processing device 102. The UI library package 118 may be received directly by the media processing device 102 where the UI elements are stored until accessed for linking with data exposed by the binding engine 104. The UI elements are arranged into the desired layout of the UI by the user experience engine 106 for presentation with the incorporated data on the presentation device 108.

Figure 2:
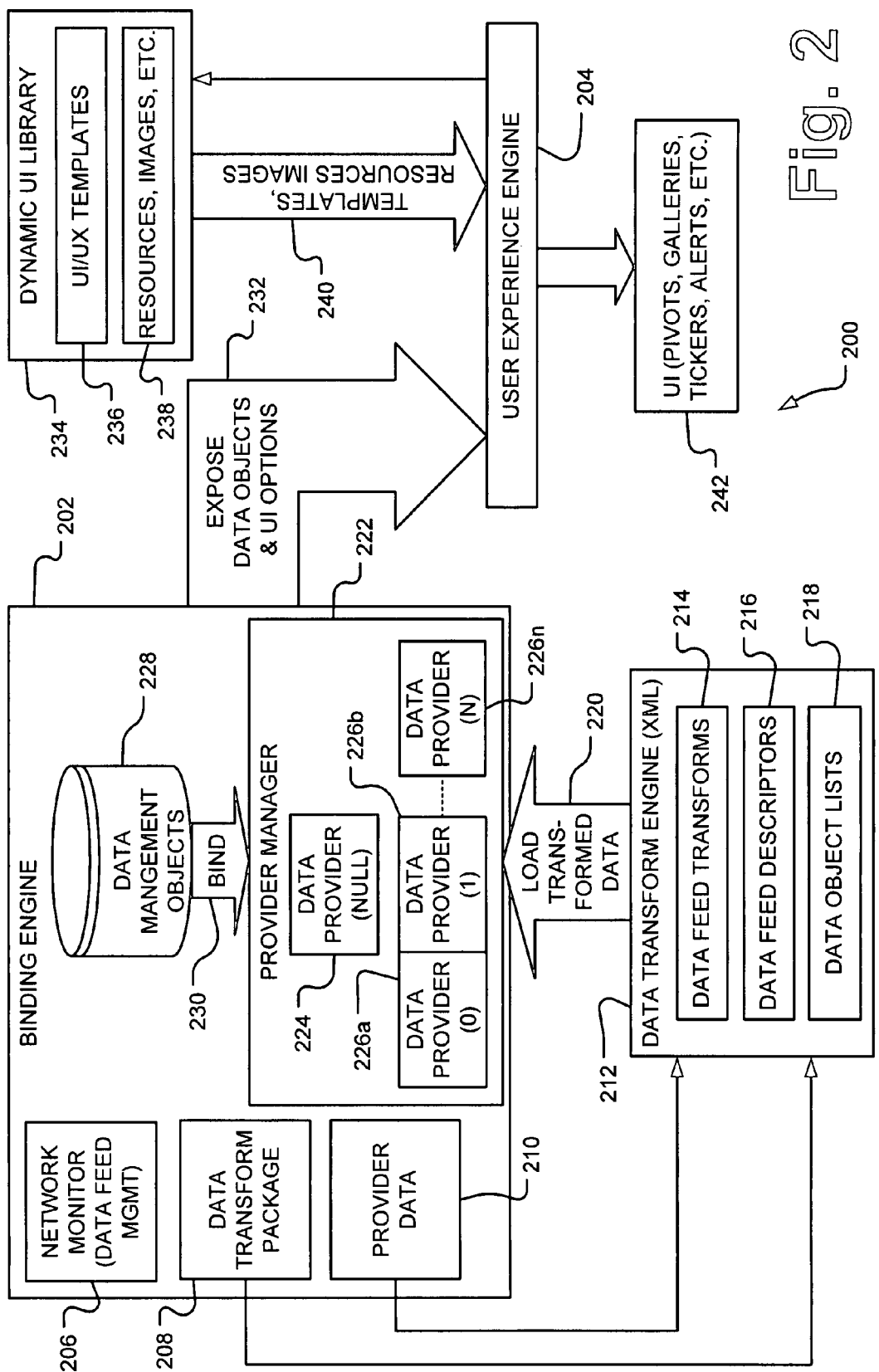
FIG. 2 is a schematic diagram of an exemplary media processing device for providing a mutable application experience.

Various exemplary components of a media processing device 200 are shown in greater detail in FIG. 2. As in FIG. 1, the primary components of the media processing device 200 include the binding engine 202 and the user experience engine 204. An additional component of the binding engine 202 not previously discussed, may be a network monitor 206. Receipt of the data transform package 208 and the provider data 110 are coordinated by the network monitor 206. The network monitor 206 acts as a manager for various data feeds that may be received from various data providers. Data feeds may be received via any of several known push protocols (e.g., Really Simple Syndication (RSS)). Alternatively, the network monitor 206 may function as a timer to regularly pull data from known locations accessible via the network. For example, the data transform package 208 may be updated regularly, but is not a constant-feed data source as may be received from the data providers. Thus, the network monitor 206 may query the source location for the data transform package 208 on a regular schedule, for example, once a day in the middle of the night in order to minimize the effect on network bandwidth. If a request to the source location confirms that a new data transform package 208 is available, the network monitor 206 may initiate and coordinate download of the updated data transform package 208.

The data transform package 208 may be understood as a set of rules or functions that are provided to the binding engine 202 in order to direct the transformation of the provider data 210 into a format that can be used by the binding engine 202. In one exemplary implementation, the provider data 210 may be provided as groupings of tagged data values, for example, data values identified using extensible mark-up language (XML). The provider data 210 tagged in such an XML schema provides a simple mechanism for data providers to identify the type and nature of data values transmitted to the media processing device 200. An exemplary XML schema for tagging provider data 220 in the context of sports related data is set forth below.

```
- <Templates>
    <Template Type="Alert"
Source="data://ThisDataProvider!this_provider_alerts.mcml#NewsAlertContent"
/>
    <Template Type="AlertHeader"
Source="data://ThisDataProvider!this_provider_alerts.mcml#NewsAlertHeader"
/>
```

-continued

```
    <Template Type="AlertHeader" Key="FinalScore"
Source="data://ThisDataProvider!this_provider_alerts.mcml#FinalScoreHeader"
/>
    <Template Type="RealtimeAlertHeader" Key="FinalScore"
Source="data://ThisDataProvider!this_provider_alerts.mcml#FinalScoreHeader"
/>
    <Template Type="Branding"
Source="data://ThisDataProvider!this_provider_brand.mcml#Branding"
/>
  </Templates>
- <League Id="5" Name="NFL">
- <Positions>
    <Position Name="Quarterback" Contains="QB" />
    <Position Name="Running Back" Contains="RB" />
    <Position Name="Fullback" Contains="FB" />
    <Position Name="Wide Receiver" Contains="WR" />
    <Position Name="Tight End" Contains="TE" />
    <Position Name="Punter" Contains="P" />
    <Position Name="Kicker" Contains="K" />
  </Positions>
- <PositionGroups>
    <Position Name="Quarterbacks" Contains="QB" />
    <Position Name="Running Backs" Contains="FB,RB" />
    <Position Name="Wide Receivers" Contains="WR" />
    <Position Name="Tight Ends" Contains="TE" />
    <Position Name="Kickers" Contains="K" />
    <Position Name="All" Contains="QB,FB,RB,WR,TE,K" />
  </PositionGroups>
- <PlayerGroup>
    <Positions>QB</Positions>
    <Name>QUARTERBACKS</Name>
    <Column Name="COMP" Path="nfl-player-stats-
passing/completions/completions" />
    <Column Name="ATT" Path="nfl-player-stats-passing/attempts/attempts" />
    <Column Name="YDS" Path="nfl-player-stats-passing/yards/yards" />
    <Column Name="TD" Path="nfl-player-stats-passing/touchdowns/touchdowns" />
    <Column Name="INT" Path="nfl-player-stats-
passing/interceptions/interceptions" />
    <Column Name="RUSH" Path="nfl-player-stats-rushing/yards/yards" />
    <Column Name="RATE" Path="nfl-player-stats-passing/qb-rating/rating" />
  </PlayerGroup>
                                          * * *
- <ScoresFeed>
    <FeedId>nfl_scores</FeedId>
    <GroupType>ByDate</GroupType>
    <Transform>nfl_scores_transform.xsl</Transform>
    <Latency>10</Latency>
- <Url>
- <![CDATA[
http://feeds.ThisDataProvider.com/scores/NFL.XML?partnerKey=cfGT1kpvLFSEko2OXNeVDckXXKjOHH3H
    ]]>
  </Url>
  </ScoresFeed>
                                          * * *
- <RealtimeAlerts>
    <FeedId>nfl_realtimealerts</FeedId>
    <Transform>nfl_alerts_transform.xsl</Transform>
    <Latency>10</Latency>
- <Url>
- <![CDATA[
http://feeds.ThisDataProvider.com/livexml/NFL/NFL_ALERTS.XML?partnerKey=cfGT1kpvLFSEko2OXNeVDckXXKjOHH3H
    ]]>
  </Url>
  </RealtimeAlerts>
- <Templates>
- <!-- Scores -->
    <Template Type="Score"
Source="data://ThisDataProvider!nfl_scores.mcml#Score" />
    <Template Type="Score" State="InProgress"
Source="data://ThisDataProvider!nfl_scores.mcml#Score_InProgress" />
    <Template Type="Score" State="Final"
Source="data://ThisDataProvider!nfl_scores.mcml#Score_Final" />
    <Template Type="ScoreRollover" State="PreGame"
Source="data://ThisDataProvider!nfl_scores_detail.mcml#ScoreRollover_PreGame"
/>
    <Template Type="ScoreRollover" State="InProgress"
Source="data://ThisDataProvider!nfl_scores_detail.mcml#ScoreRollover_InProgress"
/>
```

-continued

```
<Template Type="ScoreRollover" State="Final"
Source="data://ThisDataProvider!nfl_scores_detail.mcml#ScoreRollover_Final"
/>
                                    * * *
- <!-- Realtime Alerts -->
    <Template Type="RealtimeAlertHeader"
Source="data://ThisDataProvider!nfl_alerts.mcml#RealtimeAlertHeader" />
    <Template Type="RealtimeAlert" Key="StatusTwoMinute"
Source="data://ThisDataProvider!nfl_realtime_alerts.mcml#TwoMinuteWarning
" />
    <Template Type="RealtimeAlert" Key="FinalScore"
Source="data://ThisDataProvider!nfl_realtime_alerts.mcml#FinalScore" />
    <Template Type="RealtimeAlert" Key="RushingTouchdown"
Source="data://ThisDataProvider!nfl_realtime_alerts.mcml#RushingTouchdown"
/>
    <Template Type="RealtimeAlert" Key="PassingTouchdown"
Source="data://ThisDataProvider!nfl_realtime_alerts.mcml#PassingTouchdown"
/>
    <Template Type="RealtimeAlert" Key="ReturnTouchdown"
Source="data://ThisDataProvider!nfl_realtime_alerts.mcml#ReturnTouchdown"
/>
                                    * * *
</Templates>
</League>
```

This schema may be specific to a particular data provider. In the context of the sports example, the transform data may consist of game scores, player statistics, identification of players presently in the game, player rosters, game statistics, news alerts, and other real-time alerts associated with a particular sporting event. As in the above example, XML schema data related to NFL football may be tagged with various data types. As expressed above, the data may include information about player positions (e.g., who is actually playing the position), player statistics (e.g., passing attempts and related yardage), and scoring at various stages of the game as well as a final score. The data may also include a variety of real-time alerts as indicated, for example, touchdown occurrences and the type of play used to score (e.g., rushing, passing, or punt return).

The data transformation engine 212 may be a separate standalone module or it may be a standard part of particular operating system, for example, the ".NET" platform from Microsoft Corporation. The data transform package 208 is input into the data transform engine 212 to provide a framework and instructions for processing the provider data 210. The data transform engine 212 first processes the data transform package 208 to determine the appropriate data feed transforms for processing the provider data 210. The data transform engine 212 may employ standard transform scheme for example, an extensible style-sheet language transform (XSLT) in order to provide data in a format useful to the binding engine 202. In an alternate implementation, the binding engine 202 may unpack the instructions in the data transform package 208, e.g., in the form of an XSLT document, and takes the incoming provider data 210, e.g., in the form of an XML document, and supplies both as inputs to the data transform engine 212, e.g., a .NET runtime engine. Once the data feed transforms 214 are understood, the data transform engine 212 can read the data feed descriptors 216, for example, XML tags that identify specific data types in the provider data 210, and then transform the data feed descriptors into a descriptor format used by the binding engine 202.

The data transform engine 212 may further develop data object lists 218 to pass to the binding engine 202. The data object lists 218 may be understood as linking instructions that tell the binding engine 202 how to bind 230 the provider data 210 to particular data management objects 228 in the binding engine 202. Once the transformation of the provider data 210 within the data transform engine 212 is complete, the transformed data is loaded back into the binding engine 202 as indicated by the operational loading indicator 220 in FIG. 2. When the transformed data is loaded 220 into the binding engine 202 from the data transform engine 212, it may be organized by a provider manager 222 according to the data object lists 218. In one implementation, the data object lists 218 may organize the transformed data 220 according to the particular data provider source 226a, 226b, 226n.

This type of organization by data provider may be desirable, for example, because different providers of similar information may provide different types or categories of information. Further, the associated display instructions and UI templates and resources may be particular to that data provider. Alternatively, the data from different data providers may be relevant to completely unrelated subject matter designed to provide a completely different application experience to a user. For example, one data provider may provide only information related to sporting events, while a second data provider may provide information related to the Academy Awards ceremony. In this scenario, one can understand that the ultimate UI experiences are likely to be significantly different.

As shown in the provider manager 222 in FIG. 2, in addition to separation and organization of the data into different data provider sources 226a, 226b, 226n, a generic null data provider block 224 may be used. The null data provider block 224 may be selected by the binding engine 202 to provide a generic or default UI experience when the program is initialized. This allows the user to select between any of the other application experiences specific to the available data providers 226a, 226b, 226n and provides an opportunity for the media processing devices to load the relevant data in a selected UI. The UI corresponding to the null data provider block 224 thus dynamically changes into a revised UI 242 experience corresponding to the chosen data provider. Note, however, the revised UI 242 does not result from the launch of a separate application. The revised UI 242 is prepared by the user experience engine 204 from alternate data and instructions exposed by the binding engine 202 and alternate UI templates 236 and resources 238 selected from the dynamic UI library 234 as further described below.

The binding engine 202 may also use the data object lists 218 to instantiate appropriate data management objects 228 that bind 230 with the transformed data in particular arrangements defined by the data management objects 228. The data management objects 228 represent the primary functionality of the binding engine 202 and perform operations to collect and group together additional information related to a particular type of provider data 210 received from a data provider.

These binding operations may be better understood again in the context of a sports media example. Suppose, for example, that a data provider provides a data feed with the score of a NBA basketball game. The data feed may include the names of the teams, the quarter presently being played, and the score. Upon receipt of this data, the binding engine 202 will select an appropriate data management object 228 to bind with the data. For example, there may be a particular data object that is designed to manage NBA basketball games. The NBA game object may have further associated behaviors for the collection of additional related information. For example the NBA game object may use team ID information in the data to seek out additional information about the teams to bind with the NBA game object. This information could include things like the team rosters, game schedules, and win/loss record information. The NBA game object may look for this information within the other data in the present data feed or it may instruct the network monitor 206 to seek out additional information over the network in order to fulfill such data requests. The NBA game object may further consult an EPG guide on the media processing device 200 to provide information about any relating programming, for example, whether a broadcast network is presently carrying the game.

The NBA game object may further instantiate other related management objects 228 to seek additional information for possible presentation to a user. For example, the NBA game object may instantiate a NBA league object that seeks information at a league level rather than a game level in either the provider data 210 or through requests of the network monitor 206. Such information could include the regular season schedule for the entire league or team standings. The NBA league object could further consult the EPG for a schedule of network broadcasts of any NBA game within a certain time frame. Any relevant data that the NBA league object finds may be bound to the NBA league object by the binding engine 202. The NBA game object may further instantiate a player object which seeks data regarding individual players on the teams participating in the particular game, for example, player names, player statistics, and news items regarding particular players, and can bind such data within the object.

Alternatively, any new data found may not actually be bound, but rather looked up when needed by an object itself or by another object, e.g., a "collection manager" object managing a list of league objects. The link to the extra information may be provided by an object via runtime-accessible properties and methods, but the object itself may or may not cache or store that additional data.

Once the appropriate data management objects 228 are bound 230 with transform data specific to one of the particular data providers 226a, 226b, 226n, the populated data management objects 228 and any UI instructions related to a particular data provider are exposed 232 to the user experience engine 204. The user experience engine 204 queries the dynamic UI library 234 and requests the appropriate UI templates 236 for building a UI particular to the chosen data provider based upon the associated UI instructions 232. The user experience engine 204 further requests any additional resources and images 238, for example, music, pictures, logos, and other presentation information responsive to the UI instructions 232.

Recall that the dynamic UI library 234 may be regularly updated with packages of new or changed templates 236 and new and alternative resources, images, or other presentation information 238. The UI templates 236 may be authored by the data providers and may thus include identification information and function calls for associating specific UI templates 236 and resources 238 with the bound data objects 232 related the particular data provider. Thus, the UI 242 presented to the user may be dynamically changed and updated whenever desired. The user experience engine 204 then combines the data exposed by the data management objects 228 with the appropriate UI templates 236 and, in conjunction with the resources and images 238, creates a UI 242 unique to the data provider for presentation to the user.

It should be understood that the provider data 210 may be constantly received at the media processing device 200 or requested by the network monitor 206 in order to provide real-time data for presentation within the UI 242. This real-time aspect of presentation of data may be particularly important or desirable in the context of an application experience presenting sports related information. Data pertaining to live sporting events is constantly in flux and may be regularly updated. For example, scores constantly change; players are constantly substituted; game status changes as it progresses into new innings, periods, or quarters; and statistics related to individual teams, players, and even leagues change as each game progresses. Thus, the binding engine 202 constantly binds the data management objects 228 with update transformed data 220 from the data feeds and exposes 232 data management objects 228 bound with updated data to the user experience engine 204. Similarly, the selected UI templates 236 may be regularly updated and output for presentation as part of the UI 242.

Figure 3:
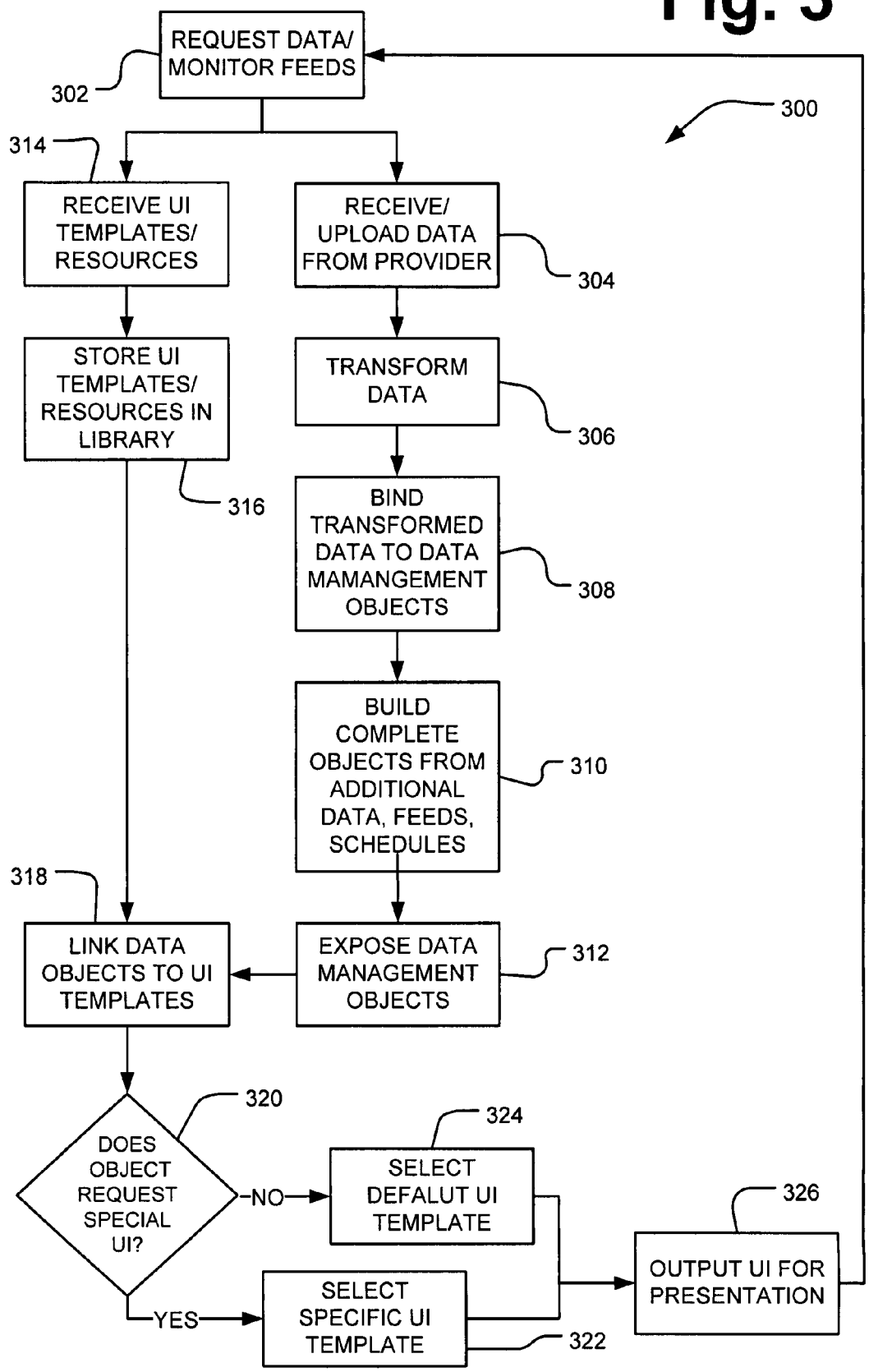
FIG. 3 is a flow diagram of an exemplary implementation of a process for creating a mutable application experience.

FIG. 3 depicts an exemplarily UI generation process for creating a mutable application experience on a media processing device, for example, as described with respect to FIGS. 1 and 2. The UI generation process 300 begins with a requesting operation 302 in which the network monitor requests provider data and monitors data feeds from data providers. In a receiving operation 304, data is received or downloaded from a particular data provider for use in creating the application experience. As previously indicated, the data is transformed in a transformation operation 306 by a data transform engine in order to provide the data in a format that the binding engine can use. Once the data is transformed, it is bound with the data management objects in a binding operation 308. The data management objects then proceed to build structures of associated data from additional available data, incoming data feeds, EPG schedules, and other data sources in building operation 310. In addition, as previously indicated the building operation 310 may include the instantiation of additional related management objects that collect and provide additional related data for exposure and potential presentation to a user. Once the data management objects have linked with all available related data, the data management objects are exposed to the user experience engine in exposing operation 312.

In parallel with the transformation and linking of provider data, the UI generation process 300 also includes receiving UI templates and related resources as part of a UI library package in receiving operation 314. The UI templates and resources are stored in a dynamic UI library associated with the binding engine in storing operation 316. The user experience engine then links the data from the data management objects with related and appropriate UI templates in order to construct a custom UI associated with the data in linking operation 318.

In one exemplary implementation, the user experience engine may interrogate the data management objects in a search for particular designations for rendering a particular UI, e.g., a incorporating a UI template unique to a particular data provider as shown in query operation 318. If a unique UI is specified, the user experience engine will select that specific UI template from the dynamic UI library in selecting operation 320. Alternatively, if no specific UI template is requested, then the user experience engine may select a default template to handle the types of data exposed by the data management objects and arrange them for presentation as indicated in selecting operation 322. Once the appropriate UI templates, associated resources, and images are selected, a UI is compiled and output for presentation on a presentation device in outputting operation 324. The UI generation process 300 then iterates and returns to requesting operation 302 to monitor the data feeds and update the information that is ultimately presented to the user in outputting operation 324.

Figure 4:
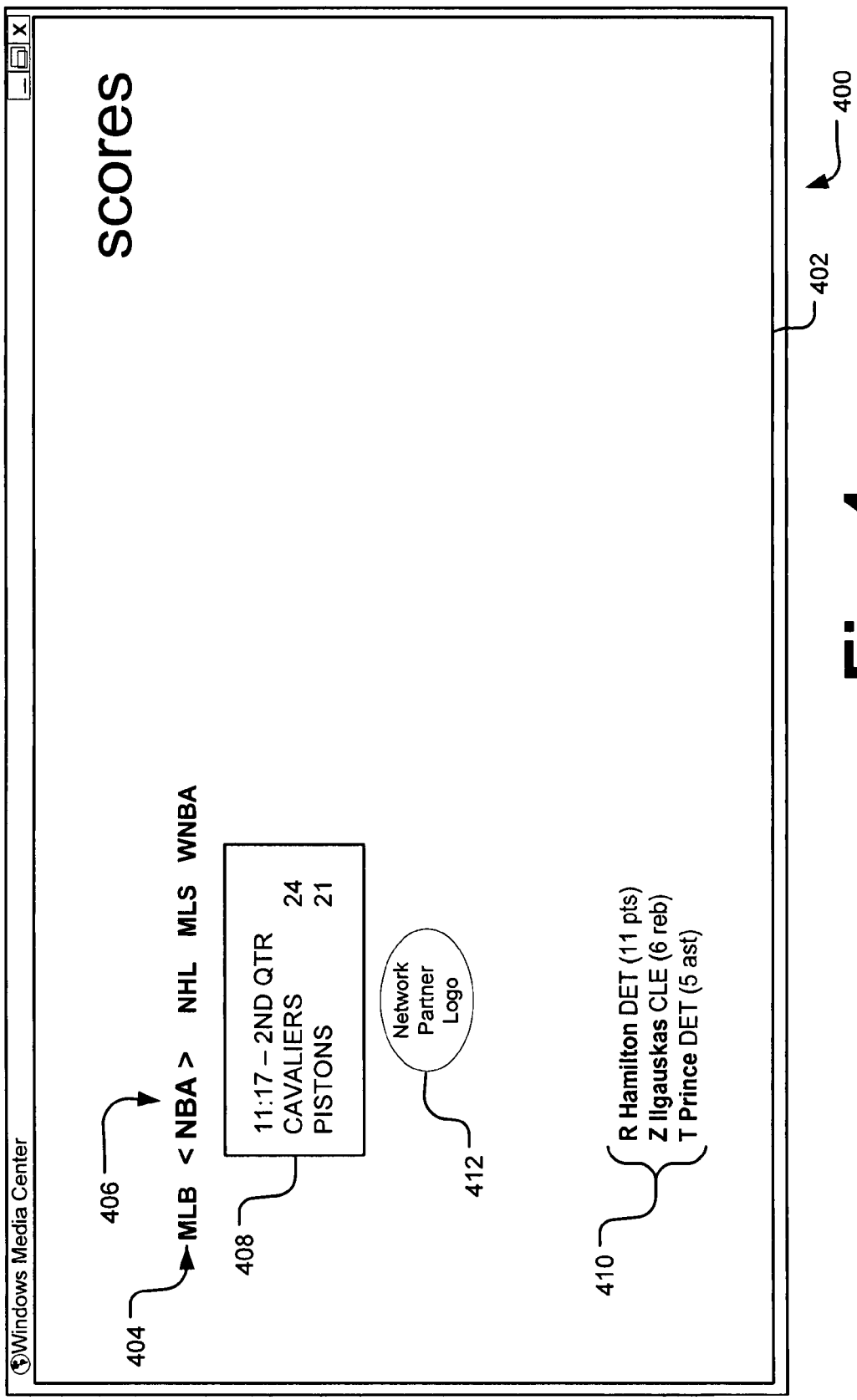
FIG. 4 is a schematic diagram of a first implementation of an exemplary user interface for presenting regularly updated data.
Figure 5:
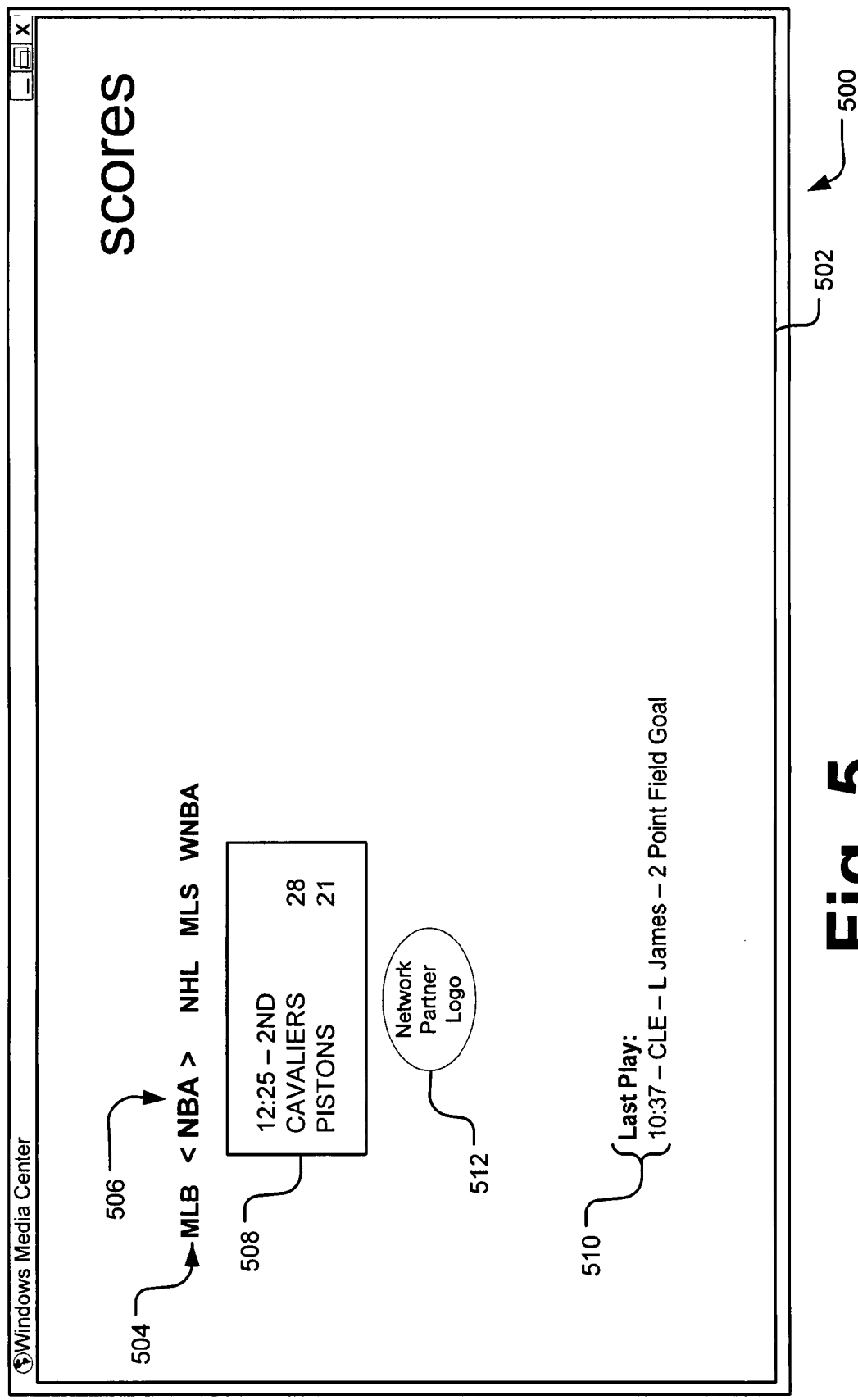
FIG. 5 is a schematic diagram of a revised implementation of the exemplary user interface of FIG. 4 for presenting regularly updated data.

FIGS. 4 and 5 show one example of how the process of FIG. 3 may be implemented to create a mutable application experience for a user. FIG. 4 depicts a first implementation 400 of a UI 402 presenting sport scores information. The UI 402 includes a pivot menu element 404, a ticker element 408, and an alert element 410. The pivot menu element is a horizontal scrolling menu UI element. In this particular example, several professional sports leagues are available for selection to view related sport scores. In the example depicted, the NBA is selected 406 and the ticker 408 provides information about a basketball game between the Cleveland Cavaliers and the Detroit Pistons. The ticker shows that with 11 minutes and 17 seconds expired in the second quarter, the Cavaliers are besting the Pistons by a score of 24 to 21. Note that the information in the ticker 408 may be updated on a regular and frequent basis with information from a data feed as the score of the basketball game changes from minute to minute. In addition, an alert template 410 provides information identifying the best performing players in the game at any given moment. In this implementation, the alert template 410 is populated with the highest scoring player, his team, and the number of points scored; the player with the most rebounds, his team, and the number of rebounds made; and the player with the most assists, his team, and the number of assists made. Again this information may vary from moment to moment, and the alert template 410 and the UI 402 will be constantly updated to reflect any changes. In addition, one or more logos 412 may be presented within the UI 402 to identify a network partner or data provider providing the information. Again, such logos or other images are entirely mutable and may be changed based upon the data or UI instructions received.

FIG. 5 depicts a second implementation 500 of UI 502 for presentation of professional sport scores and information. Again the UI 502 depicts a pivot menu 504, a ticker 508, and an alert 510. As in FIG. 4 the NBA is selected 506 on the pivot menu and the ticker 508 displays information about the Cavaliers and Pistons game. As noted in the ticker 508, the game has progressed a little over a minute and the Cavaliers are now beating the Pistons 28-21. Thus, the data indicating the time lapse in the game as well as the scores has been updated via a data feed processed by the binding engine. In addition, the ticker 508 has also been updated in its presentation format as the period indication no longer says "2ND QTR" as in FIG. 4 and now only says "2ND."

Similarly, the alert 510 is based on a completely different template than the alert in FIG. 4. The alert 510 presents information regarding the most recent play in the game that has been provided in the data feed. In this case the last play alert 510 indicates the time the play was made, the team making the play, the player making the play, and the action performed, in this case a 2 point field goal by LeBron James. Notice the disparity in the time of the play as opposed to the time the ticker shows along with the present score. This disparity may be a normal occurrence with respect to data feeds from sporting events in which it is much easier to quickly update a score than it is to input data regarding actual occurrences within the game. As before, a graphic 512 such as a logo of the data provider may be presented as part of the UI 502. Again, it is notable that the UI experience has been changed between FIGS. 4 and 5. However, the underlying applications creating the user experience, i.e., the binding engine and the user experience engine, are completely agnostic to the data received and the UI templates provided; their functions remain the same while the UI may be varied widely.

Figure 6:
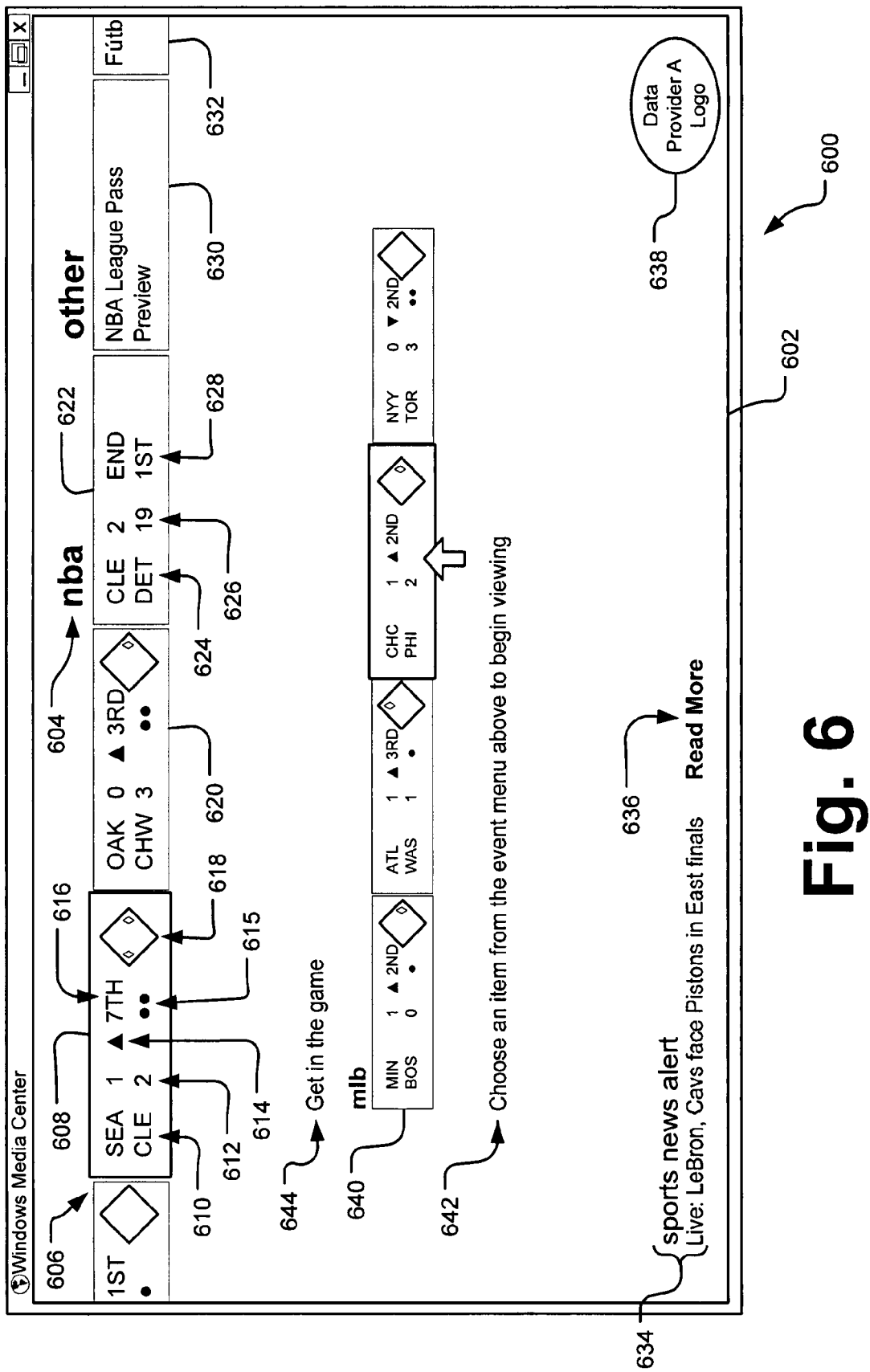
FIG. 6 is a schematic diagram of a second implementation of an exemplary user interface for presenting regularly updated data from a particular data provider.
Figure 7:
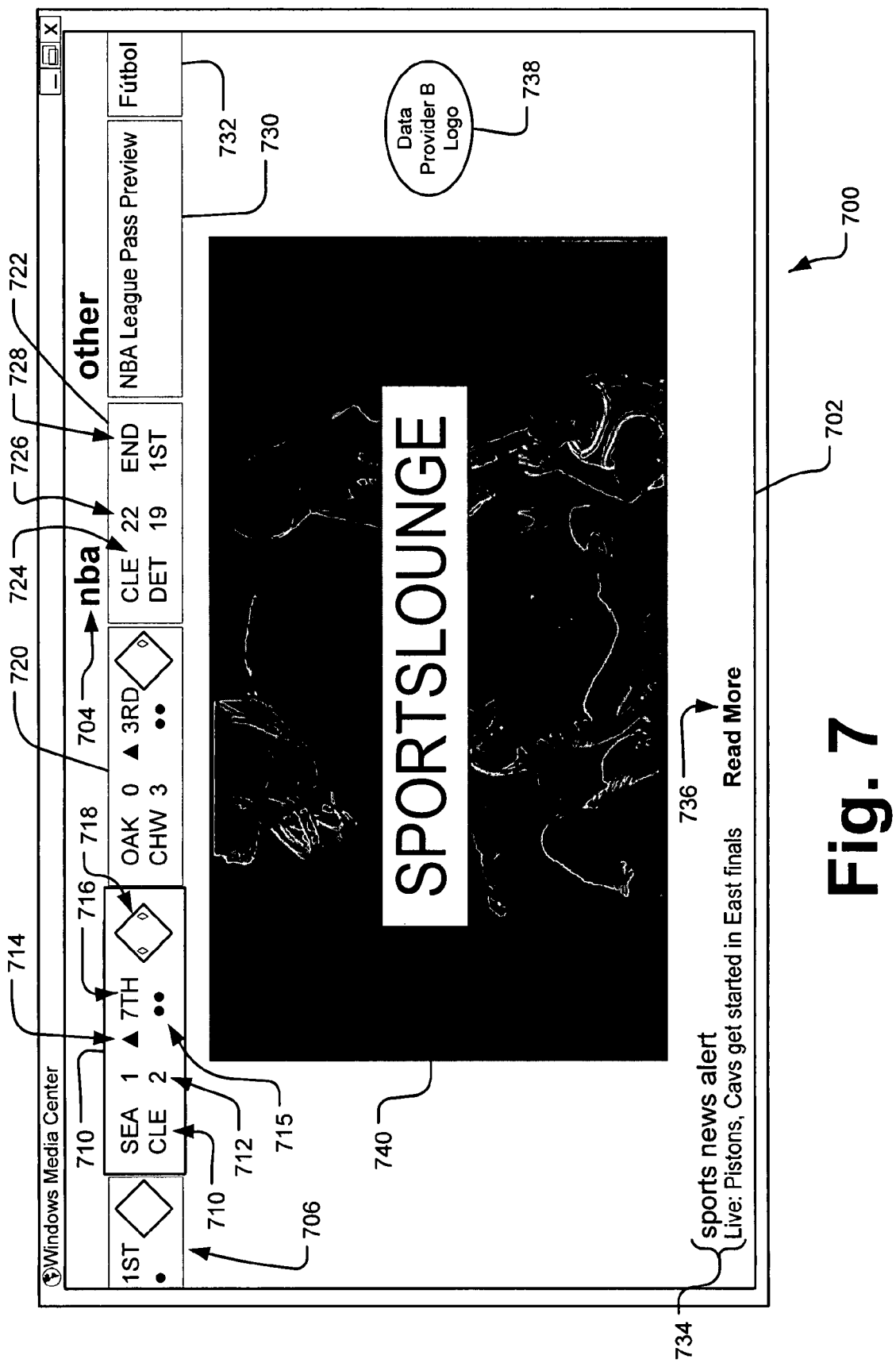
FIG. 7 is a schematic diagram of an alternate implementation of an exemplary user interface for presenting regularly updated data from an alternate data provider.

FIGS. 6 and 7 provide another example of mutable application experiences that may be provided to a user. In these examples, application experiences may be understood as particular to different data providers. In FIG. 6, a first form of the application experience 600 for a first data provider is rendered in the UI 602. At the top of the UI 602 is a pivot menu 604, beneath which is program gallery 606. The program gallery 606 generally provides the user a selection of programs for viewing. In this implementation of the UI 602, the program gallery 606 is constructed using a series of game tickers in addition to more standard types of gallery objects such as the program identifier blocks 630, 632. The selected ticker 608 identifies a baseball game currently in progress. Instead of merely indicating the game is available for viewing, the tickers in the gallery 606 provide additional real-time information about the games in progress.

The selected ticker 608 identifies the teams playing in the team column 610 and the score of the game in the score column 612. As this is a baseball game, the ticker 608 also includes an indicator 614 to indicate whether it is the top or bottom of a particular inning and an inning indicator 616 identifying the present inning. Additionally, the ticker 608 includes an out status indicator 615, in this case indicating that there are two outs, and a on-base indicator 618, in this case showing the runners presently at first base and third base. Clearly, such a gallery using a ticker with real-time information provides significantly more information about the status of a live event than merely indicating that the program is available to watch.

A second ticker 620 for a baseball game also indicates the teams, the score, the top or bottom of the inning, the inning number, the number of outs, and the base-running status. This game may also be available for viewing if the user so selects. This is the last of the baseball games for viewing in the program gallery 606.

Another ticker 622 indicates that a basketball game is available for viewing, which is further indicated by the NBA heading in the pivot menu 604. The basketball ticker 622 is based upon a different gallery UI template then the baseball games. The basketball ticker 622 includes a team name column 624, a score column 626, and period indication column 628. No additional information about the basketball game is included in the basketball ticker 622.

The UI further includes an alert item 634 providing headline information related to sports programming available. In addition to the alert 634, there is a related link 636 that, upon selection, will access and present to the user additional information related to the alert 634, for example, a full news story related to the headline in the alert 634. A logo 638 indicating the particular data provider or network partner associated with the information in this application experience 600 may also be provided in the UI 602.

In this particular implementation of the UI 602 and in conjunction with this particular data provider is an instructional UI 640 that teaches a user how to operate the pivot menu 604 and the program gallery 606 to make a program selection from the gallery 606 for viewing. An instructional message 642 may accompany the graphical image 640 to aid in explaining how to select a program from the gallery for viewing. This particular UI 602 additionally includes a marketing message 644 for presentation to a user.

In contrast FIG. 7 provides an alternate application experience 700 in a modified UI 702 associated with a different data provider than the data provider in FIG. 6. The UI 702 similarly provides a pivot menu 704 with a program gallery 706 for selection of various sports programs for viewing. At the tope of the UI 702 is a pivot menu 704, beneath which is program gallery 706. In this implementation of the UI 702, the program gallery 706 is constructed using a series of game tickers 708 in addition to more standard types of gallery objects such as the program identifier blocks 730, 732. As above, the selected ticker 708 identifies a baseball game currently in progress. Instead of merely indicating the game is available for viewing, the selected ticker 708 in the gallery 706 provides additional real-time information about the game in progress.

The selected ticker 708 identifies teams playing in the team column 710 and the score of the game in the score column 712. As this is a baseball game, the ticker 708 includes an indicator 714 to indicate whether it is the top or bottom of a particular inning and an inning indicator 716 identifying the present inning. Additionally, the ticker 708 includes an out status indicator 715, in this case indicating that there are two outs, and an on-base indicator 718, in this case showing the runners presently at first and third.

A second ticker 720 for a baseball game also indicates the teams, the score, the top or bottom of the inning, the inning number, the number of outs, and the base-running status. This game may also be available for viewing if the user so selects. This is the last of the baseball games for viewing in the program gallery 706. Another ticker 722 indicates that a basketball game is available for viewing, which is further indicated by the NBA heading in the pivot menu 704. The basketball ticker 722 is based upon a different gallery UI template than the baseball games. The basketball ticker 722 includes a team name column 724, a score column 726, and period indication column 728. In this respect the user application experience for the second data provider is similar to the experience provided by the first data provider as they may have both selected standard pivot menu and program gallery UI templates for implementation.

However, the remainder of the UI 702 in FIG. 7 is somewhat different than the UI 602 in FIG. 6. For example, the alert 734, although providing similar information to the alert in FIG. 6, is actually different textually, because the source of the data is different. The UI 702 still allows the user to select a link 736 to read more information corresponding to the alert 734. A data provider or network partner logo 738 is also presented, but it is in a different location than the logo placement in FIG. 6 and also indicates the source as a different provider. Finally, instead of providing a tutorial on program selection from the program gallery, the UI 702 presents a large graphic 740 branding this particular implementation of the user experience.

An exemplary hardware and operating system for implementing a mutable application experience as described above is represented in FIG. 8. The system includes a general purpose computing device in the form of a computer 800, including a processing unit 802, a system memory 804, and a system bus 818 that operatively couples various system components, including the system memory 804 to the processing unit 802. There may be only one or there may be more than one processing unit 802, such that the processor of computer 800 comprises a single central processing unit (CPU), or a plurality of processing units, commonly referred to as a parallel processing environment. The computer 800 may be a conventional computer, a distributed computer, or any other type of computer; the invention is not so limited.

The system bus 818 may be any of several types of bus structures including a memory bus or memory controller, a peripheral bus, a switched fabric, point-to-point connections, and a local bus using any of a variety of bus architectures. The system memory 804 may also be referred to as simply the memory, and includes read only memory (ROM) 806 and random access memory (RAM) 805. A basic input/output system (BIOS) 808, containing the basic routines that help to transfer information between elements within the computer 800, such as during start-up, is stored in ROM 806. The computer 800 further includes a hard disk drive 830 for reading from and writing to a hard disk, not shown, a magnetic disk drive 832 for reading from or writing to a removable magnetic disk 836, and an optical disk drive 834 for reading from or writing to a removable optical disk 838 such as a CD ROM or other optical media.

The hard disk drive 830, magnetic disk drive 832, and optical disk drive 834 are connected to the system bus 818 by a hard disk drive interface 820, a magnetic disk drive interface 822, and an optical disk drive interface 824, respectively. The drives and their associated computer-readable media provide nonvolatile storage of computer-readable instructions, data structures, program modules and other data for the computer 800. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 830, magnetic disk 832, optical disk 834, ROM 806, or RAM 805, including an operating system 810, one or more application programs 812, other program modules 814, for example, the binding engine and the user experience engine, and program data 816, for example, the data feeds from the data providers, the data transform packages, and the UI library packages.

A user may enter commands and information into the personal computer 800 through input devices such as a keyboard 840 and pointing device 842, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 802 through a serial port interface 826 that is coupled to the system bus 818, but may be connected by other interfaces, such as a parallel port, game port, or a universal serial bus (USB).

A monitor 844 or other type of display device is also connected to the system bus 818 via an interface, such as a video adapter 846. In addition to the monitor 844, computers typically include other peripheral output devices, such as a printer 858 and speakers (not shown). These and other output devices are often connected to the processing unit 802 through the serial port interface 826 that is coupled to the system bus 818, but may be connected by other interfaces, such as a parallel port, game port, or a universal serial bus (USB). A media tuner module 860 may also be connected to the system bus 818 to tune audio and video programming (e.g., TV programming) for output through the video adapter 846 or other presentation output modules.

The computer 800 may operate in a networked environment using logical connections to one or more remote computers, such as remote computer 854. These logical connections may be achieved by a communication device coupled to or integral with the computer 800; the invention is not limited to a particular type of communications device. The remote computer 854 may be another computer, a server, a router, a network personal computer, a client, a peer device, or other common network node, and typically includes many or all of the elements described above relative to the computer 800, although only a memory storage device 856 has been illustrated in FIG. 8. The logical connections depicted in FIG. 8 include a local-area network (LAN) 850 and a wide-area network (WAN) 852. Such networking environments are commonplace in office networks, enterprise-wide computer networks, intranets and the Internet, which are all types of networks.

When used in a LAN 850 environment, the computer 800 may be connected to the local network 850 through a network interface or adapter 828, e.g., Ethernet, a wireless access point or router, or other communications interfaces. When used in a WAN 852 environment, the computer 800 typically includes a modem 848, a network adapter, WiFi card, or any other type of communications device for establishing communications over the wide area network 852. The modem 848, which may be internal or external, is connected to the system bus 818 via the serial port interface 826. In a networked environment, program modules depicted relative to the personal computer 800, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system for dynamically presenting data in a mutable presentation format, the system comprising
   a processor for executing computer-executable modules; and
   memory storing computer-executable modules including:
      a data transformation module that is governed by an updatable transform instruction package, wherein the data transformation module transforms data associated with one or more data providers according to instructions in the instruction package into a bindable format;
      a binding engine module that binds the transformed data to management objects and exposes the data-bound management objects for incorporation of the transformed data into a user interface; and
      a user interface generation module that links the data-bound management objects with updatable user interface elements based upon instructions received from the data providers in the transform instruction package to form a mutable user interface incorporating the transformed data.

2. The system of claim 1 further comprising a network monitor module that receives updated data over a network from the one or more data providers and provides the updated data to the data transformation module.

3. The system of claim 1 further comprising
   a network monitor module that receives updated user interface elements over a network from a network source; and
   a dynamic user interface element library that stores the user interface elements for access by the user interface generation module.

4. The system of claim 1, wherein the binding engine module instantiates additional management objects in response to types of transformed data provided by the data transformation module.

5. The system of claim 1, wherein the data-bound management objects in the binding engine module seek and bind with additional data related to the transformed data provided by the data transformation module.

6. The system of claim 1, wherein the data-bound management objects instantiate additional management objects to seek and bind with additional data in response to types of transformed data initially bound with the data-bound management objects.

7. The system of claim 1, wherein
   the management objects update bindings with updated transformed data in response to provision of updated transformed data from the data transformation module; and
   the user interface generation module updates links between the data-bound management objects and the user interface templates in real time to provide a revised mutable user interface.

8. The system of claim 1, wherein
   the binding engine module identifies a list of data providers associated with the transformed data as a source of the data and groups together data-bound management objects having a common data provider source; and
   the user interface generation element links only a single group of the data-bound management objects with the user interface elements.

9. A method in a computer system for dynamically constructing a user interface incorporating data received in real time, the method comprising
- binding data received in real time to management objects;
- exposing the data-bound management objects for incorporation of the data from the data-bound objects into user interface elements;
- selecting user interface elements from an updatable library based upon one or more of: types of data received, identification of a data provider, and instructions from the data provider;
- accessing a set of instructions for linking the data-bound management objects to the selected user interface elements;
- incorporating the data from the data-bound management objects into the selected user interface elements as the data is received;
- presenting the selected user interface elements incorporating the data; and
- dynamically updating the presentation of the selected user interface elements incorporating the data in response to one or more of: receiving updated data, receiving updated instructions, and updating user interface elements.

10. The method of claim 9 further comprising
- receiving the data in a first form,
- receiving transformation instructions,
- transforming the data from the first form into a second form capable of binding with the associable management objects.

11. The method of claim 9 further comprising
- grouping the data-bound management objects in groups corresponding to data received from a common data provider; and
- exposing only data-bound management objects having data corresponding to a selected data provider.

12. The method of claim 9 further comprising seeking additional related data to bind with the management objects according to operations defined within the management objects.

13. The method of claim 9 further comprising instantiating additional management objects to seeking additional related data to bind with the additional management objects according to operations defined within the data-bound management objects.

14. A computer-readable medium having computer-executable instructions for performing a computer process implementing the method of claim 9.

15. A method in a computer system for implementing a mutable user interface, the method comprising
- selecting a set of user interface elements from an updatable library based upon one or more of: types of data to be presented, identification of a data provider, and instructions from the data provider;
- linking the selected set of user interface elements with data exposed for incorporation into the user interface;
- presenting the selected set of user interface elements incorporating the data;
- updating the selection of the set of user interface elements based upon exposure of updated data;
- linking the updated set of user interface elements with corresponding updated data for incorporation into the user interface; and
- presenting the updated set of user interface elements incorporating the updated data.

16. The method of claim 15, wherein the updating operation further comprises selecting alternate user interface elements based upon one or more of: types of updated data to be presented and revised instructions from the data provider.

17. The method of claim 15, wherein the updating operation further comprises selecting revised user interface elements based upon one or more of: types of updated data to be presented and revised instructions from the data provider.

18. The method of claim 15, wherein the updating operation further comprises selecting additional user interface elements based upon one or more of: types of updated data to be presented and revised instructions from the data provider.

19. The method of claim 15, further comprising one or more of:
- incorporating less than a total amount of the data exposed for incorporation into the user interface into the selected set of user interface elements; and
- incorporating less than a total amount of the updated data exposed for incorporation into the user interface into the updated set of user interface elements.

20. A computer-readable medium having computer-executable instructions for performing a computer process implementing the method of claim 15.

* * * * *